United States Patent
Tamura et al.

(10) Patent No.: US 12,529,397 B2
(45) Date of Patent: Jan. 20, 2026

(54) SEALING DEVICE FOR HUB BEARING

(71) Applicant: NOK CORPORATION, Tokyo (JP)

(72) Inventors: Kenichi Tamura, Fukushima (JP); Kazuki Hirota, Fukushima (JP)

(73) Assignee: NOK CORPORATION (JP)

( * ) Notice: Subject to any disclaimer, the term of this patent is extended or adjusted under 35 U.S.C. 154(b) by 116 days.

(21) Appl. No.: 18/447,508

(22) Filed: Aug. 10, 2023

(65) Prior Publication Data
US 2024/0068519 A1     Feb. 29, 2024

(30) Foreign Application Priority Data

Aug. 23, 2022   (JP) ................................ 2022-132560
Jul. 12, 2023   (JP) ................................ 2023-114208

(51) Int. Cl.
*F16C 33/78*     (2006.01)

(52) U.S. Cl.
CPC ...... *F16C 33/7823* (2013.01); *F16C 33/7883* (2013.01)

(58) Field of Classification Search
CPC ................ F16C 33/782; F16C 33/7823; F16C 33/7826; F16C 33/7853; F16C 33/7863; F16C 33/7869; F16C 33/7876; F16C 33/7883
See application file for complete search history.

(56) References Cited

U.S. PATENT DOCUMENTS

| | | | | |
|---|---|---|---|---|
| 10,794,428 B2 * | 10/2020 | Shuto | ...................... | F16C 33/80 |
| 2019/0277340 A1 | 9/2019 | Shuto et al. | | |
| 2021/0010532 A1 | 1/2021 | Shiramizu et al. | | |

FOREIGN PATENT DOCUMENTS

| | | | | |
|---|---|---|---|---|
| EP | 3546776 A1 | 10/2019 | | |
| EP | 3819526 A1 | 5/2021 | | |
| EP | 4556734 A1 | 5/2025 | | |
| JP | 2004-218797 A | 8/2004 | | |
| JP | 2012-021616 A | 2/2012 | | |
| JP | 2013-124764 A | 6/2013 | | |
| JP | 2018-071604 A | 5/2018 | | |
| WO | WO-2012127895 A1 * | 9/2012 | .......... | C10M 171/02 |
| WO | 2018-097233 A1 | 5/2018 | | |
| WO | WO-2020009005 A1 * | 1/2020 | ............ | F16C 19/185 |

OTHER PUBLICATIONS

Translation of WO2012127895 obtained Feb. 5, 2025.*
Extended European Search Report for corresponding Application No. 23191081.1 dated Jan. 22, 2024 (8 Pages).
European Office Action for corresponding European Application No. 23191081.1 dated Jul. 16, 2025 (7 Pages).

* cited by examiner

*Primary Examiner* — James Pilkington
(74) *Attorney, Agent, or Firm* — Harness, Dickey & Pierce, P.L.C.

(57) ABSTRACT

A hub seal seals a gap between an outer race member and an inner race member of a hub bearing. The hub seal includes: an annular base; and a seal member attached to the base and including an annular elastic material. The seal member includes a side lip extending toward an outer side and an intermediate lip extending toward the outer side on an inner periphery side relative to the side lip. A sliding surface of the side lip that comes into contact to seal the gap between the outer race member and the inner race member is rougher than a sliding surface of the intermediate lip that comes into contact to seal the gap between the outer race member and the inner race member.

14 Claims, 7 Drawing Sheets

SEALING DEVICE FOR HUB BEARING

CROSS-REFERENCE TO RELATED APPLICATIONS

This application is based upon and claims the benefit of priority from Japanese Patent Application No. 2022-132560, filed on Aug. 23, 2022 and Japanese Patent Application No. 2023-114208, filed on Jul. 12, 2023, the entire contents of the above applications are incorporated herein by reference.

BACKGROUND

Technical Field

The present disclosure relates to a sealing device for a hub bearing that seals a gap between an outer race member and an inner race member of a hub bearing for an automobile or the like to prevent the entry of foreign matter.

Background Art

A sealing device for a hub bearing has been known. The sealing device is disposed in a hub bearing including a cylindrical outer race member and an inner race member including a shaft relatively rotatable with respect to the outer race member on an inner side of the outer race member, the sealing device sealing a gap between the outer race member and the inner race member to prevent the entry of foreign matter (muddy water or the like). The sealing device includes a seal member including an elastic material and fixed on an outer race member side. A side lip and an intermediate lip are formed in the seal member, extending toward the inner race member to come into contact with the inner race member to seal the gap between the outer race member and the inner race member. With a rotation of the inner race member, the side lip and the intermediate lip in a state of sealing the gap relatively slide with respect to the inner race member. The side lip and the intermediate lip thus reduce the entry of the foreign matter.

Some sealing devices have a mat unevenness formed in sliding surfaces of the side lip and the intermediate lip. Such a sealing device has a reduced contact area with the inner race member by virtue of the mat unevenness, which reduces the generation of an excessive friction force to decrease a rotation torque (for example, see Japanese Patent Application Publication No. 2013-124764, International Publication No. WO 2018/097233, and Japanese Patent Application Publication No. 2018-071604).

However, if such a sealing device is used under a muddy environment where the sealing device is to be extremely frequently exposed to muddy water, foreign matter in the muddy water would enter little by little through a slight gap of the mat unevenness and accumulate on an internal side relative to the side lip and the intermediate lip. In this case, an effect in reducing the entry of foreign matter would fail to be sufficiently exhibited, leading to degradation of a sealing performance of the sealing device. Accordingly, there is some room left for improvement in order to implement a sealing device that decreases a rotation torque and reduces the entry of foreign matter in muddy water even under a muddy environment.

In view of the above circumstances, the present disclosure implements a sealing device for a hub bearing that decreases a rotation torque and reduces the entry of foreign matter in muddy water even under a muddy environment.

SUMMARY

In order to solving the above problem, the present disclosure provides the following sealing devices.

[1-1] A sealing device for a hub bearing that is to be disposed in a hub bearing including a cylindrical outer race member and an inner race member including a shaft relatively rotatable with respect to the outer race member on an inner side of the outer race member, the sealing device sealing a gap between the outer race member and the inner race member to prevent the entry of foreign matter, the sealing device including: a base including an annular rigid plate, the base being attached to the outer race member from an inner peripheral surface side of the outer race member and fixed to the outer race member; and an annular seal member including an elastic material, the seal member being connected with the base in a manner to cover one surface of the base, the seal member including a side lip and an intermediate lip that are seal lip portions, the seal lip portions extending in a direction away from the one surface of the base toward the inner race member to come into contact with the inner race member and seal the gap between the outer race member and the inner race member while being relatively slidable with respect to the inner race member with a rotation of the inner race member, in which the side lip is slidable while being in contact with the inner race member at a position closer to an opening of the gap than the intermediate lip and has a sliding surface in which a mat unevenness is formed and that is rougher than a sliding surface of the intermediate lip.

[1-2] A sealing device for a hub bearing being mounted on a hub bearing including a cylindrical outer race member and an inner race member including a shaft relatively rotatable with respect to the outer race member on an inner side of the outer race member seals a gap between the outer race member and the inner race member to prevent the entry of foreign matter, the sealing device including: a base including a annularly molded rigid plate, the base being attached to the outer race member from an inner peripheral surface side of the outer race member and fixed to the outer race member; and an annular seal member including an elastic material, the seal member being connected with the base in a manner to cover one surface of the base, the seal member including a side lip and an intermediate lip that are seal lip portions, the seal lip portions extending in a direction away from the one surface of the base toward the inner race member to come into contact with the inner race member and seal the gap between the outer race member and the inner race member while being relatively slidable with respect to the inner race member with a rotation of the inner race member, in which the side lip is slidable while being in contact with the inner race member at a position closer to an opening of the gap than the intermediate lip and has a sliding surface subjected to surface finishing that forms a surface texture that prevents the entry of foreign matter particles having a particle size equal to or more than a predetermined value and allows for the entry of foreign matter particles having a particle size less than the predetermined value, and the intermediate lip has an unfinished sliding surface not subjected to the surface finishing and prevents the entry of the foreign matter particles having the particle size less than the predetermined value entering beyond the side lip.

[1-3] The sealing device for a hub bearing according to [1-1] or [1-2], in which the side lip has the sliding surface in which the mat unevenness having a ten-point average roughness Rzjis defined in accordance with JIS B 0601-2001 is formed, the ten-point average roughness Rzjis being larger than a ten-point average roughness Rzjis of an unevenness of the sliding surface of the intermediate lip.

[1-4] The sealing device for a hub bearing according to [1-3], in which
the side lip has the sliding surface in which the mat unevenness having the ten-point average roughness Rzjis of 0.8 μm or more is formed, and
the ten-point average roughness Rzjis of the unevenness of the sliding surface of the intermediate lip is 0.7 or less.

[1-5] The sealing device for a hub bearing according to [1-4], in which
the side lip has the sliding surface in which the mat unevenness having the ten-point average roughness Rzjis of 10 μm or more is formed, and
the ten-point average roughness Rzjis of the unevenness of the sliding surface of the intermediate lip is 0.5 or less.

[1-6] The sealing device for a hub bearing according to [1-5], in which a grease serving as a lubricant is stored in the gap between the outer race member and the inner race member sealed by the sealing device, the seal member includes a grease lip for reducing leakage of the grease from the gap and that is another seal lip portion different from the side lip and the intermediate lip, and the grease lip is slidable while being in contact with the inner race member at a position spaced more from the opening of the gap than the intermediate lip and has a sliding surface in which a mat unevenness having a ten-point average roughness Rzjis larger than the ten-point average roughness Rzjis of the sliding surface of the side lip is formed.

[2-1] A sealing device for a hub bearing for sealing a gap between an outer race member and an inner race member of a hub bearing, the sealing device including:
a base having an annular shape around an axis; and an elastic body attached to the base, the elastic body including an elastic material having an annular shape around the axis, in which the elastic body includes a side lip extending toward one side relative to a direction of the axis and an intermediate lip extending toward the one side on an inner periphery side relative to the side lip, and a seal surface of the side lip that is a surface that comes into contact to seal the gap is rougher than a seal surface of the intermediate lip that is a surface that comes into contact to seal the gap.

[2-2] The sealing device for a hub bearing according to [2-1], in which the seal surface of the side lip being in contact to seal the gap is adapted to let larger foreign matter through than the seal surface of the intermediate lip being in contact to seal the gap.

[2-3] The sealing device for a hub bearing according to [2-1], in which a surface roughness of the seal surface of the side lip is rougher than a surface roughness of the seal surface of the intermediate lip.

[2-4] The sealing device for a hub bearing according to [2-3], in which the surface roughness of the seal surface of the side lip is a ten-point average roughness Rzjis defined in accordance with JIS B 0601-2001, and the surface roughness of the seal surface of the intermediate lip is a ten-point average roughness Rzjis defined in accordance with JIS B 0601-2001.

[2-5] The sealing device for a hub bearing according to [2-1], in which the seal surface of the side lip is a seal surface formed by applying surface finishing, and the seal surface of the intermediate lip is a seal surface formed by applying surface finishing or a seal surface formed without applying surface finishing.

[2-6] The sealing device for a hub bearing according to [2-1], further including a grease lip, in which the grease lip has a seal surface, the seal surface being a surface that comes into contact to seal the gap, a position for the seal surface of the grease lip to come into contact is on an inner periphery side relative to a position for the seal surface of the intermediate lip to come into contact, and the seal surface of the grease lip is a seal surface formed by applying surface finishing or a seal surface formed without applying surface finishing.

[2-7] The sealing device for a hub bearing according to [2-1], in which a grease is applied to the seal surface of the side lip and the seal surface of the intermediate lip, and a base oil of the grease is a base oil having a kinematic viscosity at 40° C. in a range from 10 mm$^2$/s to 40 mm$^2$/s.

[2-8] The sealing device for a hub bearing according to [2-1], in which the seal surface of the side lip is adapted to come into contact with the inner race member, and the seal surface of the intermediate lip is adapted to come into contact with the inner race member.

[2-9] The sealing device for a hub bearing according to any one of [2-1] to [2-7], further including a slinger attachable to the inner race member, the slinger having an annular shape around the axis, in which the seal surface of the side lip is adapted to come into contact with the slinger, and the seal surface of the intermediate lip is adapted to come into contact with the slinger.

[2-10] The sealing device for a hub bearing according to [2-9], in which the slinger has an annular surface facing a direction of the axis, the seal surface of the side lip is adapted to come into contact with the annular surface of the slinger, and the seal surface of the intermediate lip is adapted to come into contact with the annular surface of the slinger.

[2-11] The sealing device for a hub bearing according to [2-9], in which the slinger extends along a flange of the inner race member.

[2-12] The sealing device for a hub bearing according to [2-11], in which the hub seal is an outer-side hub seal.

[2-13] The sealing device for a hub bearing according to [2-10], in which the annular surface of the slinger extends along a plane orthogonal to the axis.

[2-14] The sealing device for a hub bearing according to [2-13], in which the hub seal is an inner-side hub seal.

[2-15] The sealing device for a hub bearing according to [2-9] dependent on [2-6], in which the seal surface of the grease lip is adapted to come into contact with the slinger.

The sealing device for a hub bearing according to the present disclosure makes it possible to decrease a rotation torque and reduce the entry of foreign matter in muddy water even under a muddy environment.

DETAILED DESCRIPTION

Description will be made below on embodiments of the present disclosure with reference to the drawings. It should be understood that the present disclosure is by no means limited to the following embodiments and design changes, improvements, and the like are to be added on the basis of common knowledge of those skilled in the art without departing from a scope of the present disclosure, if necessary.

Figure 1:
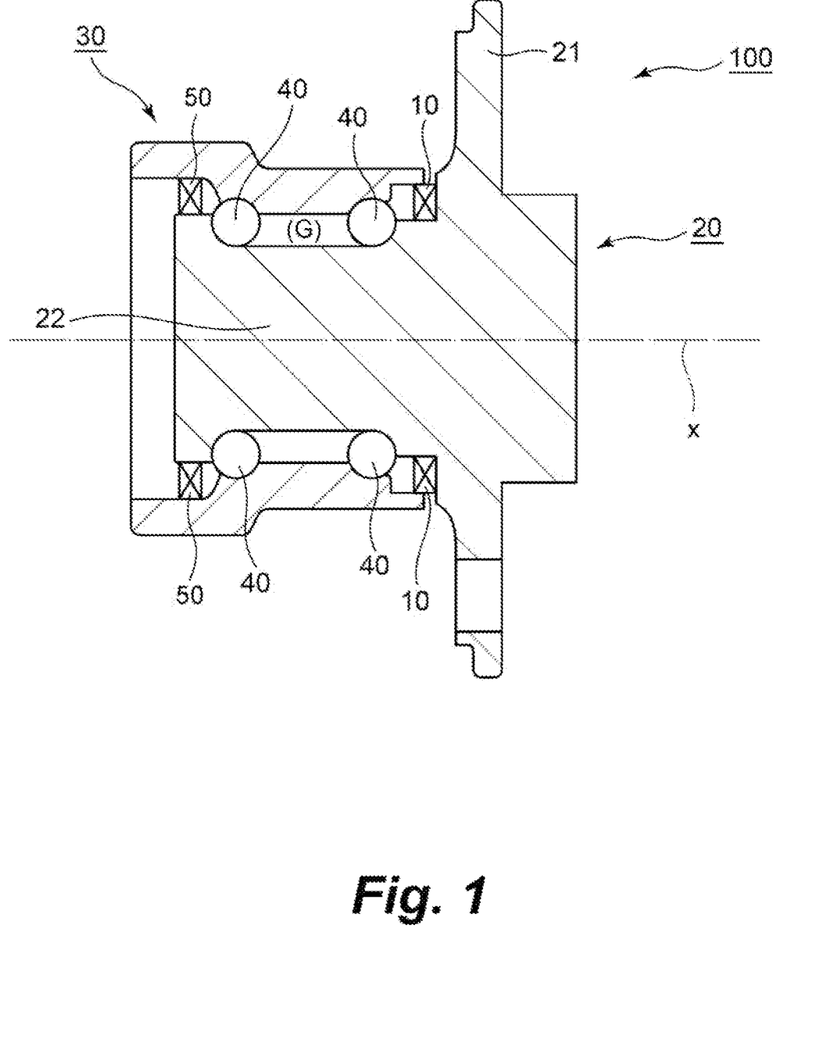
FIG. 1 is a cross-sectional view schematically illustrating a hub bearing according to a first embodiment of the present disclosure.

FIG. 1 is a cross-sectional view schematically illustrating a hub bearing 100 to which an embodiment of the present disclosure is applied.

The hub bearing 100 in FIG. 1 is a hub bearing for an automobile and includes a cylindrical outer race member 30 and an inner race member 20 including a shaft 22 relatively rotatable with respect to the outer race member 30 on an inner side of the outer race member 30. The outer race member 30 is a member beside an enclosure of an automobile and is maintained in an immobilized state together with the enclosure without rotation. In contrast, the inner race member 20 is a member beside a tire not illustrated and includes, as a part for attaching the tire, a flange 21 flanging around the shaft 22. The flange 21 is integrated with the shaft 22 and the whole of the inner race member 20 including the shaft 22 and the flange 21 rotates with a rotation of the tire.

The hub bearing 100 further includes a plurality of balls 40 arranged between the outer race member 30 and the inner race member 20. The balls 40 are members rotatable with a rotation of the inner race member 20 without causing the outer race member 30 to rotate. The outer race member 30 is thus supported in the immobilized state by the rotating inner race member 20. Here, FIG. 1 illustrates respective cross sections of the outer race member 30, the inner race member 20, and the balls 40 when the hub bearing 100 is cut along a plane including a rotation center axis of the inner race member 20.

The hub bearing 100 also includes sealing devices 10, 50 sealing a gap between the inner race member 20 and the outer race member 30 to prevent the entry of foreign matter (muddy water or the like). The sealing devices 10, 50 are sealing devices for a hub bearing and referred to as hub seals hereinbelow. Here, the automobile equipped with the hub bearing 100 is often used under a muddy environment where the automobile is to be extremely frequently exposed to muddy water and the hub seals 10, 50 are beneficial especially under such a muddy environment. The two hub seals 10, 50 are both fixed to the outer race member 30 and come into slidable contact with the inner race member 20 and, in principle, similar configurations are applicable. The hub seal 10 is an outer-side hub seal and in slidable contact with the flange 21, whereas the hub seal 50 is an inner-side hub seal and in slidable contact with the shaft 22. Accordingly, the hub seals 10, 50 have shapes slightly different in accordance with shapes of respective counterparts for slidable contact. It should be noted that although a slidable contact portion of the hub seal 50 is usually provided with an annular slinger, an explicit illustration of the slinger is omitted in FIG. 1 with the assumption that the slinger is disposed as a part of the shaft 22 in the slidable contact portion of the hub seal 50.

With the assumption that the present disclosure is applied to the hub seal 10, a configuration of the hub seal 10 will be described below in detail.

Figure 2:
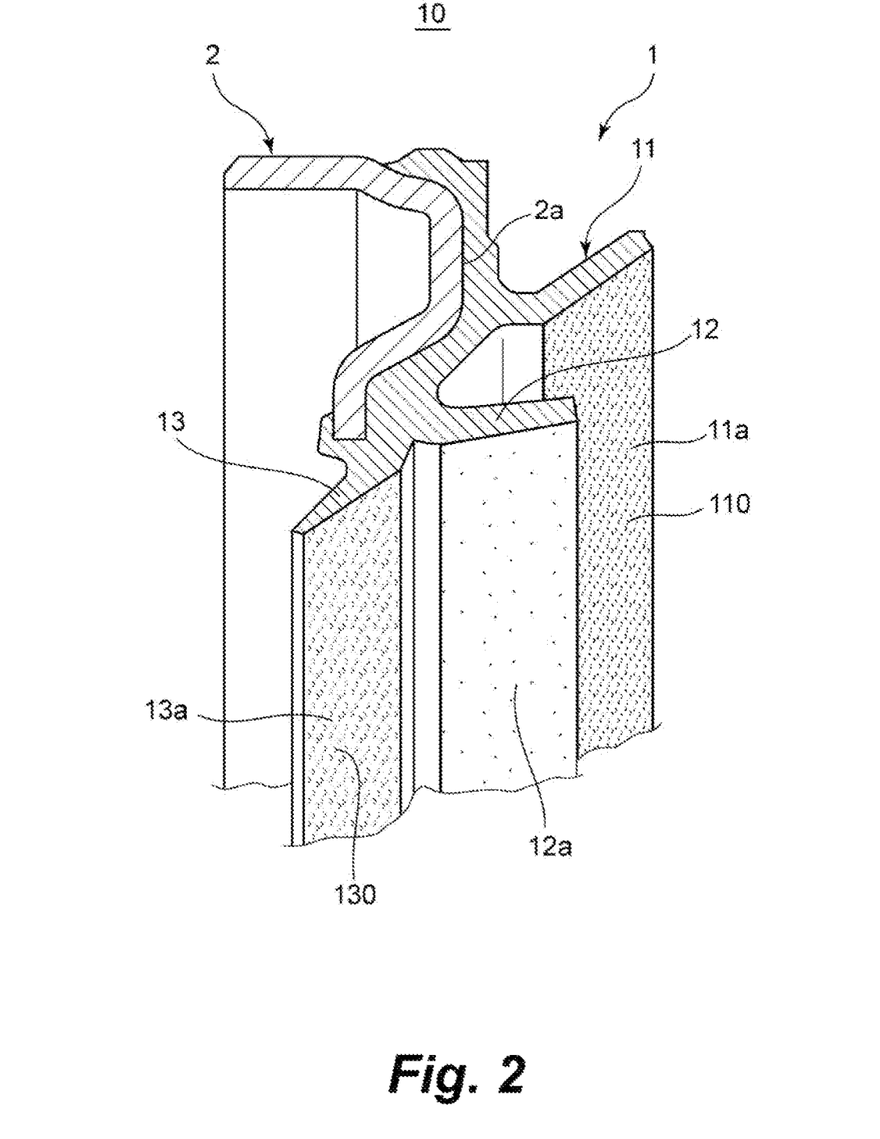
FIG. 2 is a perspective view of a sealing device according to the first embodiment of the present disclosure in FIG. 1.
Figure 3:
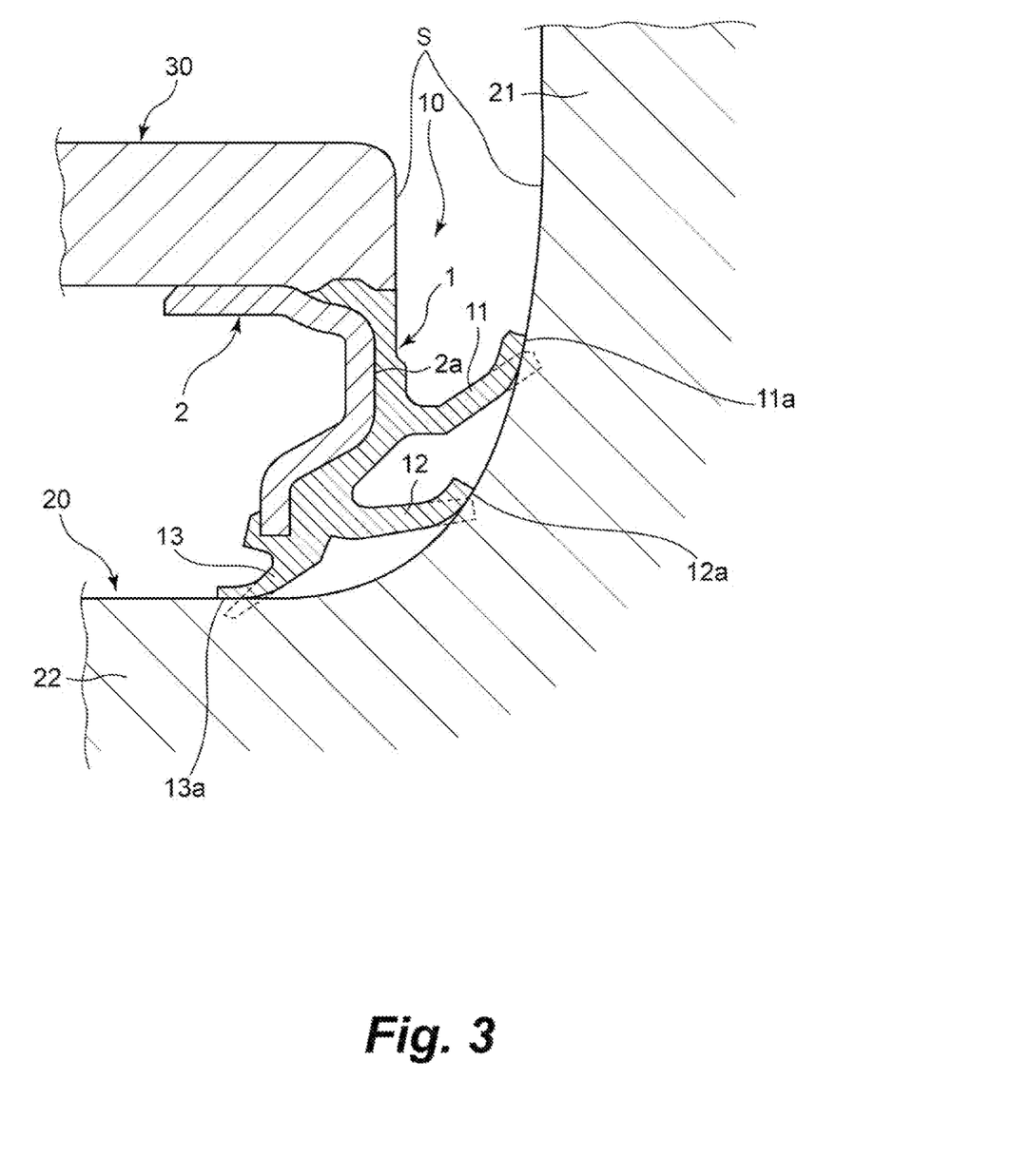
FIG. 3 is a cross-sectional view of the sealing device in FIG. 1.

FIG. 2 is a perspective view of the hub seal 10 in FIG. 1 and FIG. 3 is a cross-sectional view of the hub seal 10 in FIG. 1.

The hub seal 10 is a hub seal that seals the gap between the outer race member and the inner race member 20 to prevent the entry of foreign matter as described above and includes a seal member 1 and a base 2. The seal member 1 includes an elastic body and is a member having an annular shape around an axis x. The base 2 includes a reinforcing ring and is a member having an annual shape around the axis x.

The base 2 is a member including an annular rigid plate and is attached to the outer race member 30 from an inner peripheral surface side of the outer race member and fixed to the outer race member 30 as illustrated in FIG. 3.

In contrast, the seal member 1, which is an annular member including an elastic material, is connected with the base 2 in a manner to cover one surface 2a of the base 2 as illustrated in FIG. 2 and FIG. 3 and includes a side lip 11 and an intermediate lip 12, the side lip 11 extending toward one side (an outer side) relative to a direction of the axis x, the intermediate lip 12 extending toward the one side (the outer side) relative to the direction of the axis x on an inner periphery side relative to the side lip 11. It should be noted that the "outer side" refers to a side corresponding to a wheel side relative to the direction of the axis x in the hub bearing 100, that is, a side corresponding to a right side relative to the direction of the axis x in FIG. 1. In contrast, the "inner side", or the opposite side to the "outer side", is a side corresponding to a body side relative to the direction of the axis x in the hub bearing 100, that is, a side corresponding to a left side relative to the direction of the axis x in FIG. 1. The side lip 11 and the intermediate lip 12 are both seal lip portions extending in a direction away from the above-described one surface 2a of the base 2 toward the inner race member to come into contact with the inner race member 20, thus sealing the gap between the outer race member 30 and the inner race member 20 while being relatively slidable with respect to the inner race member 20 with a rotation of the inner race member 20. The side lip 11 is a seal lip portion slidable while being in contact with the inner race member 20 at a position closer to an opening S of the gap than the intermediate lip 12, in other words, a seal lip portion that prevents the entry of foreign matter upstream of the intermediate lip 12. As illustrated in FIG. 3, the side lip 11 and the intermediate lip 12 are in contact with a neighborhood of a base end of the flange 21 in the inner race member 20.

Here, the side lip 11 has a sliding surface 11a in which a mat unevenness 110 is formed, the sliding surface 11a being rougher than a sliding surface 12a of the intermediate lip 12. The sliding surface 11a of the side lip 11 is a seal surface of the side lip 11, which is a surface that comes into contact so as to seal the gap between the outer race member 30 and the inner race member 20. The sliding surface 12a of the intermediate lip 12 is a seal surface of the intermediate lip 12, which is a surface that comes into contact so as to seal the gap between the outer race member 30 and the inner race member 20. It should be noted that the mat unevenness is a fine unevenness formed by surface finishing. The surface finishing is finishing to be performed for the purpose of formation of a sight unevenness and includes, for example, mat finish and chemical mat finish (see JIS H 0201:1998 or ISO 7583). For example, the mat unevenness is an unevenness including recesses and projections arranged at random and is formable by electrical discharge machining or blast finishing.

By virtue of making the mat unevenness 110 in the sliding surface 11a of the side lip 11 in this manner, a contact area with the inner race member 20 is reduced to reduce the generation of an excessive friction force, so that a rotation torque decreases. In addition, even though foreign matter in muddy water enters through slight gaps of the mat unevenness 110 of the sliding surface 11a of the side lip 11, a further entry is likely to be reduced by virtue of the intermediate lip 12 having the sliding surface 12a smoother than the sliding surface 11a of the side lip 11. As a result, the hub seal 10 in FIG. 2 and FIG. 3 is a hub seal that decreases the rotation torque and reduces the entry of foreign matter in muddy water even under a muddy environment. In addition, a so-called pumping ability to cause foreign matter to return to an atmosphere side from a sealing target side tends to be enhanced with an increase in value of surface roughness of a sliding surface of a lip within a specific range of surface roughness. Thus, as a pumping ability of the sliding surface 11a of the side lip 11 is higher than a pumping ability of the sliding surface 12a of the intermediate lip 12, the side lip 11 has a higher ability to discharge the entering foreign matter than the intermediate lip 12. As seen from the above, the sliding surface 11a of the side lip 11 is in a form more likely to suffer the entry of foreign matter than the intermediate lip 12, which is at least partly compensated by a pumping operation. Even in this respect, the hub seal 10 is a hub seal that decreases the rotation torque and reduces the entry of foreign matter in muddy water even under a muddy environment.

It is described that the mat unevenness 110 is formed in the sliding surface 11a of the side lip 11 in the foregoing; however, according to the present disclosure, the sliding surface 11a may be subjected to surface finishing that causes the mat unevenness 110 to be formed or may be subjected to surface finishing that causes a surface texture different from the mat unevenness 110 to be formed. For example, a plurality of parallel protrusions extending in a direction intersecting a circumferential direction of the annular seal member 1 may be formed. In any case, the surface finishing of the sliding surface 11a is surface finishing that forms a surface texture in the sliding surface 11a of the side lip 11, the surface texture preventing the entry of foreign matter particles having a particle size equal to or more than a predetermined value and allowing for the entry of foreign matter particles having a particle size less than the predetermined value. Further, the intermediate lip 12 has the unfinished sliding surface 12a not subjected to such surface finishing and prevents the entry of the foreign matter particles having the particle size less than the predetermined value entering beyond the side lip 11. It should be noted that such a predetermined value, or threshold, is determined in accordance with the degree of the surface finishing of the side lip 11, for example, the surface roughness of the side lip 11. Even in this case, the sliding surface 11a of the side lip 11 is in the form more likely to suffer the entry of foreign matter than the intermediate lip 12, which is at least partly compensated by the pumping operation.

In fact, such surface finishing reduces the contact area with the inner race member 20 to reduce the generation of an excessive friction force, so that the rotation torque decreases. In addition, even though foreign matter having a particle size less than the predetermined value in muddy water passes through the surface-finished sliding surface 11a of the side lip 11 to enter, a further entry is likely to be reduced by the intermediate lip 12 having the unfinished sliding surface 12a not subjected to the surface finishing. This results in implementation of a hub seal that decreases the rotation torque and reduces the entry of foreign matter in muddy water even under a muddy environment.

It should be noted that the feature of the present disclosure defined on the basis of such surface finishing is not inconsistent with the above-described feature of the present disclosure defined on the basis of a relationship in relative surface roughness between the sliding surface 11a of the side lip 11 and the sliding surface 12a of the intermediate lip 12. That is to say, the present disclosure may be a hub seal having both features.

Here, according to the present disclosure, it is preferable that the side lip 11 have the sliding surface 11a in which the mat unevenness 110 having a ten-point average roughness Rzjis defined in accordance with JIS B 0601-2001 is formed, the ten-point average roughness Rzjis being larger than a ten-point average roughness Rzjis of an unevenness of the sliding surface 12a of the intermediate lip 12.

This preferable form makes it possible to quantitatively evaluate a particle size or a roughness to implement the above-described feature defined on the basis of the surface finishing or the above-described feature defined on the basis of the relationship in relative roughness between the sliding surfaces 11a, 12a.

For example, it is preferable that the side lip 11 have the sliding surface 11a in which the mat unevenness 110 having a ten-point average roughness Rzjis of 0.8 μm or more is formed and the ten-point average roughness Rzjis of the unevenness of the sliding surface 12a of the intermediate lip 12 be 0.7 μm or less.

In general, a smaller surface roughness of a sliding surface of an intermediate lip allows for preventing the entry of more foreign matter; however, it is difficult to decrease a rotation torque due to an increase in friction force. In contrast, a larger surface roughness of a sliding surface of a side lip makes foreign matter unlikely to accumulate in a slight gap of a sliding surface of a side lip and causes a further reduction in rotation torque; however, foreign matter is likely to pass through the side lip to enter. Accordingly, the surface roughnesses of the sliding surfaces of the intermediate lip and the side lip are set in accordance with a usage environment, which allows for moderate achievement of a decrease of the rotation torque and a reduction in the entry of the foreign matter. For example, the ten-point average roughnesses Rzjis of the sliding surfaces 11a, 12a of the side lip 11 and the intermediate lip 12 are set within the above-described numerical range in consideration of a typical size of foreign matter particles, which allows for moderate achievement of a decrease of the rotation torque and a reduction in the entry of the foreign matter under a usual muddy environment.

Further, according to the present disclosure, it is further preferable that the side lip 11 have the sliding surface 11a in which the mat unevenness 110 having a ten-point average roughness Rzjis of 10 µm or more is formed and the ten-point average roughness Rzjis of the unevenness of the sliding surface 12a of the intermediate lip 12 be 0.5 µm or less.

In general, an average particle size of foreign matter in muddy water is often larger than 10 µm. Accordingly, as long as the ten-point average roughness Rzjis of the sliding surface 11a of the side lip 11 is 10 µm or more, it is highly probable that the entry of foreign matter particles having a relatively large size (i.e., having a particle size much larger than an average particle size) is prevented by the side lip 11. Incidentally, it is desirable that an upper limit of the ten-point average roughness Rzjis be equal to or less than 60 µm in terms of actual manufacturing process and workability in prevention of the entry of foreign matter. Incidentally, although it is significantly difficult to regulate the ten-point average roughness Rzjis defined in accordance with JIS B 0601-2001 within a several µm range from a perspective of the actual manufacturing process, a ten-point average roughness Rzjis equal to or less than 60 µm makes it possible to prevent the entry of foreign matter particles having a large particle size. However, there may be a possibility that foreign matter particles having a relatively small particle size pass through the sliding surface 11a of the side lip 11. In return for that, as long as the sliding surface 11a has the mat unevenness 110 having a ten-point average roughness Rzjis equal to or more than 10 µm or more (desirably, in a range from 10 µm to 60 µm), the contact area with the inner race member 20 is allowed to be decreased to reduce the generation of an excessive friction force.

Meanwhile, the ten-point average roughness Rzjis of the sliding surface 12a of the intermediate lip 12 being equal to or less than 0.5 µm means, in short, a flat (plain) texture state with almost no unevenness. In addition, from a perspective of manufacturing process, it means a texture state when an elastic body material is merely molded without applying any particular surface finishing. However, in such a texture state, there may be a possibility that a friction force increases due to a large contact area with the inner race member 20. In return for that, by virtue of the sliding surface 12a being significantly flattened to have a ten-point average roughness Rzjis of 0.5 µm or less, the entry of foreign matter particles having a relatively small particle size passing through the sliding surface 11a of the side lip 11 is allowed to be sufficiently prevented.

In the hub seal 10 in the above-described further preferable form, such a combination use of the side lip 11 and the intermediate lip 12 having the sliding surfaces that contradict each other in terms of properties makes it possible to more favorably decrease the rotation torque and reduce the entry of foreign matter in muddy water.

It should be noted that from a simple perspective of achievement of a decrease of the rotation torque and a reduction in the entry of foreign matter in muddy water, it is also possible that the feature of the sliding surface 11a of the side lip 11 and the feature of the sliding surface 12a of the intermediate lip 12 are exchanged. That is to say, it is also possible that the mat unevenness 110 having a ten-point average roughness Rzjis of 10 µm or more is formed in the sliding surface 12a of the intermediate lip 12 and the ten-point average roughness Rzjis of the unevenness of the sliding surface 11a of the side lip 11 is caused to be 0.5 µm or less. However, in this case, the sliding surface 11a of the side lip 11 upstream of the intermediate lip 12 is simultaneously exposed not only to foreign matter particles having a smaller particle size but also to foreign matter particles having a relatively large particle size under a muddy environment. In such a situation, once foreign matter particles having a large particle size come into a gap between the sliding surface 11a and the inner race member 20, foreign matter particles having a relatively small particle size also subsequently enter through the gap, which shortens a duration of an effect in reducing the entry of foreign matter.

In contrast, in the hub seal 10 in the above-described further preferable form, the sliding surface 11a of the side lip 11 on the upstream side reduces the entry of foreign matter particles having a relatively large particle size. This causes the sliding surface 12a of the intermediate lip 12 to be exposed to only the entry of foreign matter particles having a relatively small particle size passing through the sliding surface 11a of the side lip 11. As a result, in the hub seal 10 in the above-described further preferable form, the duration of the effect in reducing the entry of foreign matter is long as compared with a case where the features of the sliding surfaces 11a, 12a are exchanged and this is why this form is further preferable in terms of a reduction in the entry of foreign matter.

The description of FIG. 2 and FIG. 3 will be continued.

As illustrated in FIG. 1, a grease (G) is stored as a lubricant in the gap between the outer race member 30 and the inner race member 20 sealed by the hub seal 10.

Here, the seal member 1 includes, as another seal lip portion different from the side lip 1 and the intermediate lip 12, a grease lip 13 for reducing the leakage of the grease (G) from the gap as illustrated in FIG. 2 and FIG. 3. The grease lip 13 is slidable while being in contact with the inner race member 20 at a position spaced more from the opening S of the gap than the intermediate lip 12. A sliding surface 13a of the grease lip 13 is a seal surface, that is, a surface that comes into contact to seal the gap between the outer race member 30 and the inner race member 20, and a position for the sliding surface 13a to come into contact is on an inner periphery side relative to a position for the sliding surface 12a of the intermediate lip 12 to come into contact.

Here, it is particularly preferable that the grease lip 13 have the sliding surface 13a in which a mat unevenness 130 is formed, the mat unevenness 130 having a ten-point average roughness Rzjis larger than the ten-point average roughness Rzjis of the mat unevenness 110 of the sliding surface 11a of the side lip 11. It should be noted that unlike the side lip 11 and the intermediate lip 12, the grease lip 13 is in contact with not the flange 21 of the inner race member 20 but the shaft 22 of the inner race member 20 in FIG. 3.

In this particularly preferable form, the grease lip 13 has the sliding surface 13a having a ten-point average roughness Rzjis larger than the other lips, which facilitates the release of air in the gap on an inner side relative to the grease lip 13 as described in paragraph of International Publication No. WO 2018/097233. This results in reducing a rapid rise in pressure in a space in the gap on the inner side relative to the grease lip 13 and keeping the pressure in a space between the grease lip 13 and the intermediate lip 12 from becoming negative with respect to the pressure in the space in the gap, which makes it possible to avoid causing the grease lip 13 and the intermediate lip 12 to be forcefully pressed against the inner race member 20. This makes it possible to decrease the rotation torque irrespective of the presence of the grease lip 13 and, simultaneously, sufficiently reduce the entry of foreign matter in muddy water by virtue of the above-described feature.

Figure 4:
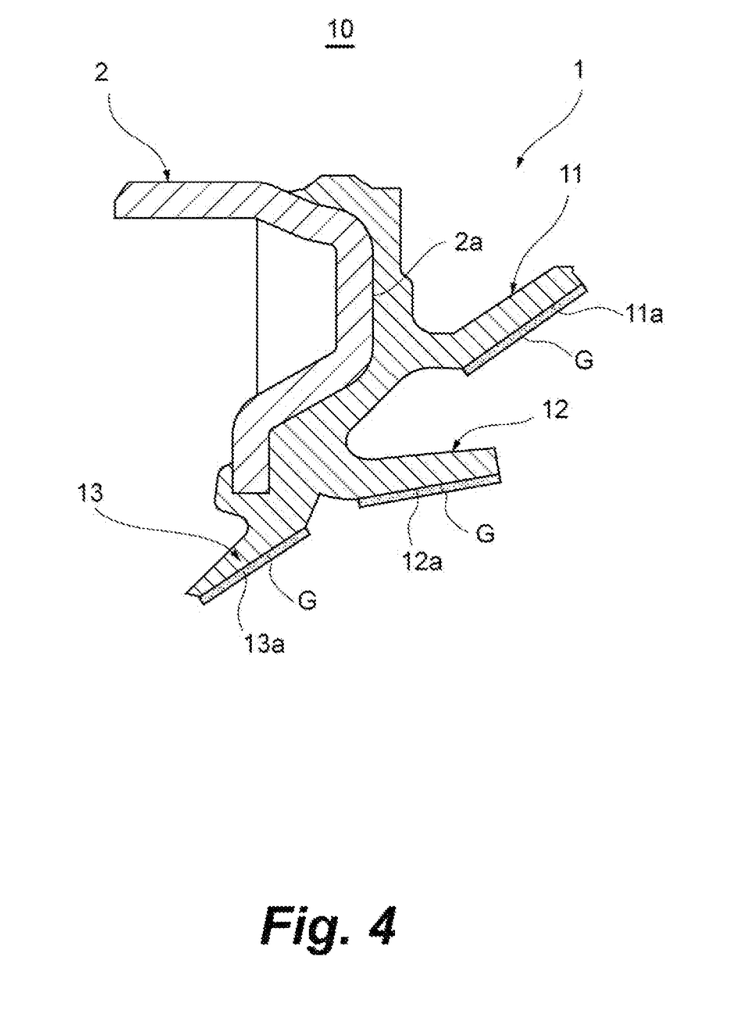
FIG. 4 is an end view of the sealing device illustrated in FIG. 2 for explaining a grease.

It should be noted that the grease G serving as a lubricant may be applied to the sliding surface 11a of the side lip 11 and the sliding surface 12a of the intermediate lip 12 as illustrated in FIG. 4. The grease G is a grease containing a base oil having a kinematic viscosity at 40° C., for example, in a range from 10 mm²/s to 40 mm²/s. It should be noted that the grease G may be applied also to the sliding surface 13a of the grease lip 13. The grease G makes it possible to decrease the rotation torques of the side lip 11, the intermediate lip 12, and the grease lip 13.

The above is the description on the first embodiment of the present disclosure.

In the above description, the example where the present disclosure is applied to the hub seal 10 in FIG. 1 is described; however, the present disclosure may be applied to the hub seal 50 in FIG. 1. The hub seal 50 will be described later.

Next, description will be made on a hub seal 10A according to a second embodiment of the present disclosure. The hub seal 10A according to the present embodiment is different from the above-described hub seal 10 in that the hub seal 10A includes a slinger 60. Hereinbelow, regarding components of the hub seal 10A, the same reference numeral is used to refer to the same component as or a component similar in function to the component of the above-described hub seal 10 and, accordingly, the description thereof is omitted and a different component is described.

Figure 5:
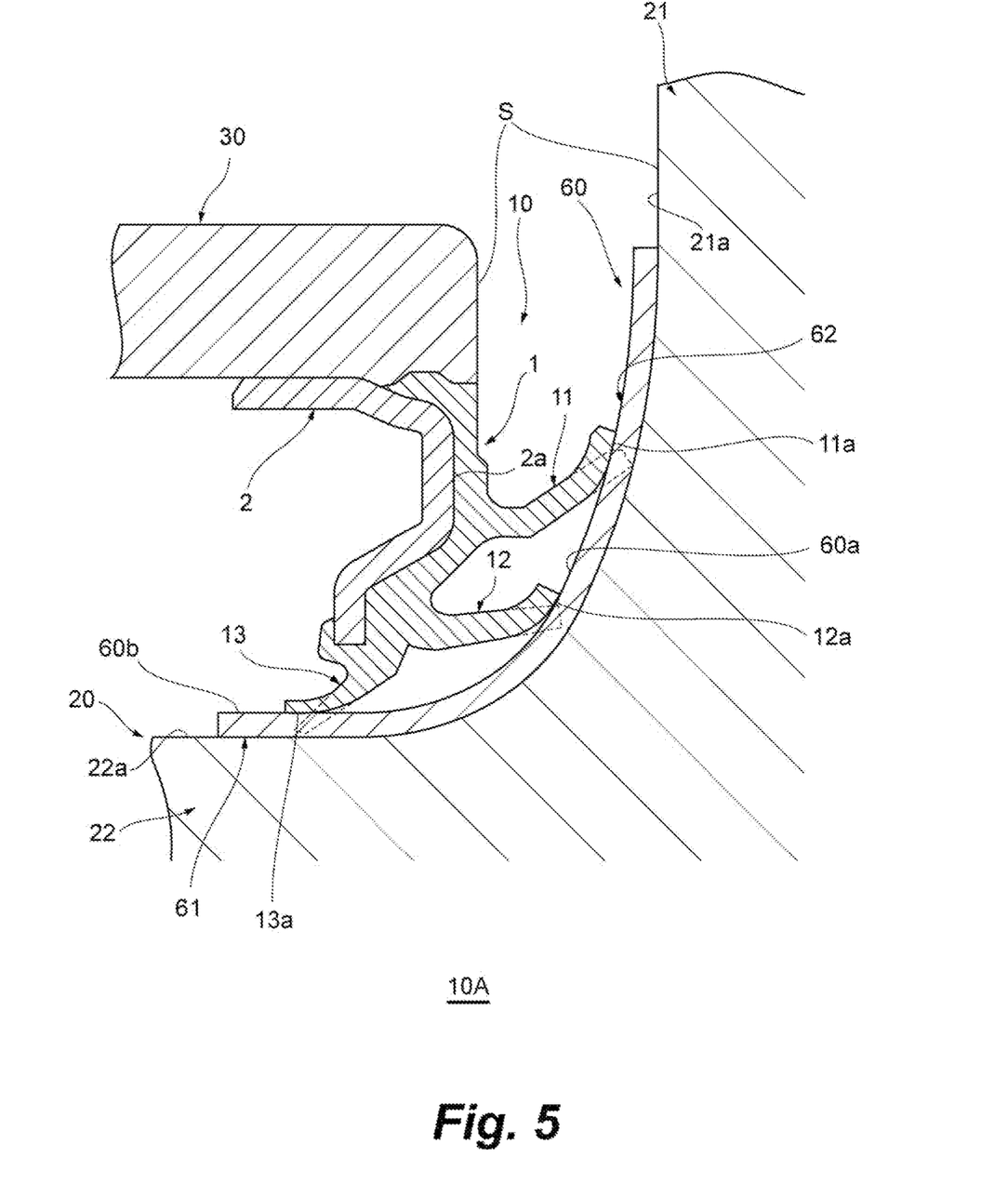
FIG. 5 is a cross-sectional view illustrating a cross section of a hub seal according to a second embodiment of the present disclosure in a state of being attached to a hub bearing, the cross section being taken along a plane including an axis x.

FIG. 5 is a cross-sectional view illustrating a cross section of the hub seal 10A according to the second embodiment of the present disclosure in a state of being attached to the hub bearing 100, the cross section being taken along a plane including an axis x. It should be noted that FIG. 5 illustrates one side of the cross section of the hub seal 10A relative to the axis x. As illustrated in FIG. 5, the hub seal 10A includes the hub seal 10 as a hub seal body and further includes the slinger 60 having an annular shape around the axis x and that is attached to the inner race member 20. In the hub seal 10A, the sliding surface 11a of the side lip 11 is adapted to come into contact with the slinger 60. In addition, in the hub seal 10A, the sliding surface 12a of the intermediate lip 12 is adapted to come into contact with the slinger 60.

The slinger 60 has a contact surface 60a that is an annular surface facing the direction of the axis x and a contact surface 60b that is an annular surface facing a radial direction. Similarly to the above-described hub seal 10, in a usage state where the hub seal 10A is attached to a desired position in the hub bearing 100, the sliding surface 11a of the side lip 11 is adapted to come into contact with the annular contact surface 60a of the slinger 60 and the sliding surface 12a of the intermediate lip 12 is adapted to come into contact with the annular contact surface 60a of the slinger 60. The contact surface 60a of the slinger 60 extends along the flange 21 of the inner race member 20. In addition, the sliding surface 13a of the grease lip 13 is adapted to come into contact with the cylindrical contact surface 60b of the slinger 60.

Specifically, the slinger 60 is, for example, an annular plate-shaped member as illustrated in FIG. 5 and includes a fitting portion 61 that is a portion extending in the direction of the axis x annularly around the axis x and a flange 62 that is an annular portion extending on an outer periphery side on an outer side relative to the fitting portion 61. The flange 62 forms the contact surface 60a. In addition, the fitting portion 61 forms the contact surface 60b.

The fitting portion 61 is, for example, a cylindrical or substantially cylindrical portion around or substantially around the axis x and is formed to be fit-attachable to an outer peripheral surface 22a of the shaft 22 of the inner race member 20. The contact surface 60b of the fitting portion 61 is, for example, a cylindrical surface or a substantially cylindrical surface around or substantially around the axis x. The flange 62 is a portion in a form of or substantially in a form of a hollow disc radially stretching around or substantially around the axis x and is formed to be able to come into contact with a side surface 21a near a base end of the flange 21 of the inner race member 20. It should be noted that the side surface 21a of the flange 21 is a surface of the flange 21 facing the inner side as illustrated in FIG. 5. The side surface 21a near the base end of the flange 21 is, for example, a curve surface curving projectingly on the inner periphery side in the cross section as illustrated in FIG. 5.

As illustrated in FIG. 5, the flange 62 of the slinger 60 is in a shape conforming to the side surface 21a near the base end of the flange 21 of the inner race member 20. The contact surface 60a of the flange 62 has a shape of a curve line in a cross section along a plane including the axis x and is smoothly continuous with the contact surface 60b of the fitting portion 61.

The slinger 60 is adapted to come into close contact with the inner race member 20. Specifically, the flange 62 of the slinger 60 and the side surface 21a of the flange 21 of the inner race member 20 are adapted to come into close contact with each other so that no gap passable for foreign matter is formed between the flange 62 and the side surface 21a. The fitting portion 61 of the slinger 60 and the outer peripheral surface 22a of the shaft 22 of the inner race member 20 are also adapted to come into close contact with each other so that no gap passable for foreign matter is formed between the fitting portion 61 and the outer peripheral surface 22a. Incidentally, regarding the close contact between the slinger 60 and the inner race member 20, it is sufficient if at least one of the close contact between the flange 62 of the slinger 60 and the side surface 21a of the flange 21 of the inner race member 20 and the close contact between the fitting portion 61 of the slinger 60 and the outer peripheral surface 22a of the shaft 22 of the inner race member 20 is achieved.

It should be noted that the slinger 60 and the inner race member 20 may be not in close contact with each other as described above. In this case, for example, an annular gasket (not illustrated) may be provided between the slinger 60 and the inner race member 20 so as to prevent foreign matter from entering a gap between the inner race member 20 and the outer race member 30 through a gap between the slinger 60 and the inner race member 20.

The slinger 60 is integrally formed from, for example, a metal plate by press working or forging and the fitting portion 61 and the flange 62 are portions of the integrally formed slinger 60. Examples of the metal material for the slinger 60 include stainless steel and SPCC (a cold rolled steel sheet).

As illustrated in FIG. 5, the sliding surface 11a of the side lip 11 is adapted to come into contact with the contact surface 60a of the flange 62 of the slinger 60. In addition, the sliding surface 12a of the intermediate lip 12 is adapted to come into contact with the contact surface 60a of the flange 62 of the slinger 60. In addition, the sliding surface 13a of the grease lip 13 is adapted to come into contact with the contact surface 60b of the fitting portion 61 of the slinger 60. It should be noted that the flange 62 of the slinger 60 is in a shape bent to have an outline curved in a cross section with an increase in diameter toward the outer side relative to the direction of the axis x as illustrated in FIG. 5. The shape of the flange 62 of the slinger 60 is not limited to the shape as illustrated in FIG. 5. For example, the flange 62 of the slinger 60 may have an annular portion extending in parallel or substantially in parallel with a plane orthogonal to the axis x along the side surface 21a of the flange 21 of the inner race member 20. In this case, the contact surface 60a of the flange 62 of the slinger 60 has a portion extending on a plane that is parallel or substantially parallel with a plane orthogonal to the axis x. In this case, the sliding surface 11a of the side lip 11 may be adapted to come into contact with a portion of the contact surface 60a of the flange 62 of the slinger 60, the portion extending on a plane that is parallel or substantially parallel with a plane orthogonal to the axis x. The sliding surface 12a of the intermediate lip 12 may also be adapted to come into contact with a portion of the contact surface 60a of the flange 62 of the slinger 60, the portion extending on a plane that is parallel or substantially parallel with a plane orthogonal to the axis x.

The hub seal 10A according to the present embodiment has the above-described configuration and is able to operate similarly to the above-described hub seal to produce a similar effect.

In addition, the slinger 60 includes a material exhibiting a high rust-proofing performance, such as stainless steel, which makes it possible to make the slinger 60 unlikely to rust. This makes it possible to reduce the formation of rust in the slinger 60 even though the slinger 60 is exposed to, for example, muddy water or salt water. Thus, it is possible to reduce degradation of sealing performances of the side lip 11, the intermediate lip 12, and the grease lip 13, resulting from a failure of the side lip 11, the intermediate lip 12, and the grease lip 13 to come into contact in desired attitudes with the slinger 60 due to the formation of rust in the contact surfaces 60a, 60b of the slinger 60 or resulting from damage to the side lip 11, the intermediate lip 12, and the grease lip 13 due to rust.

Figure 6:
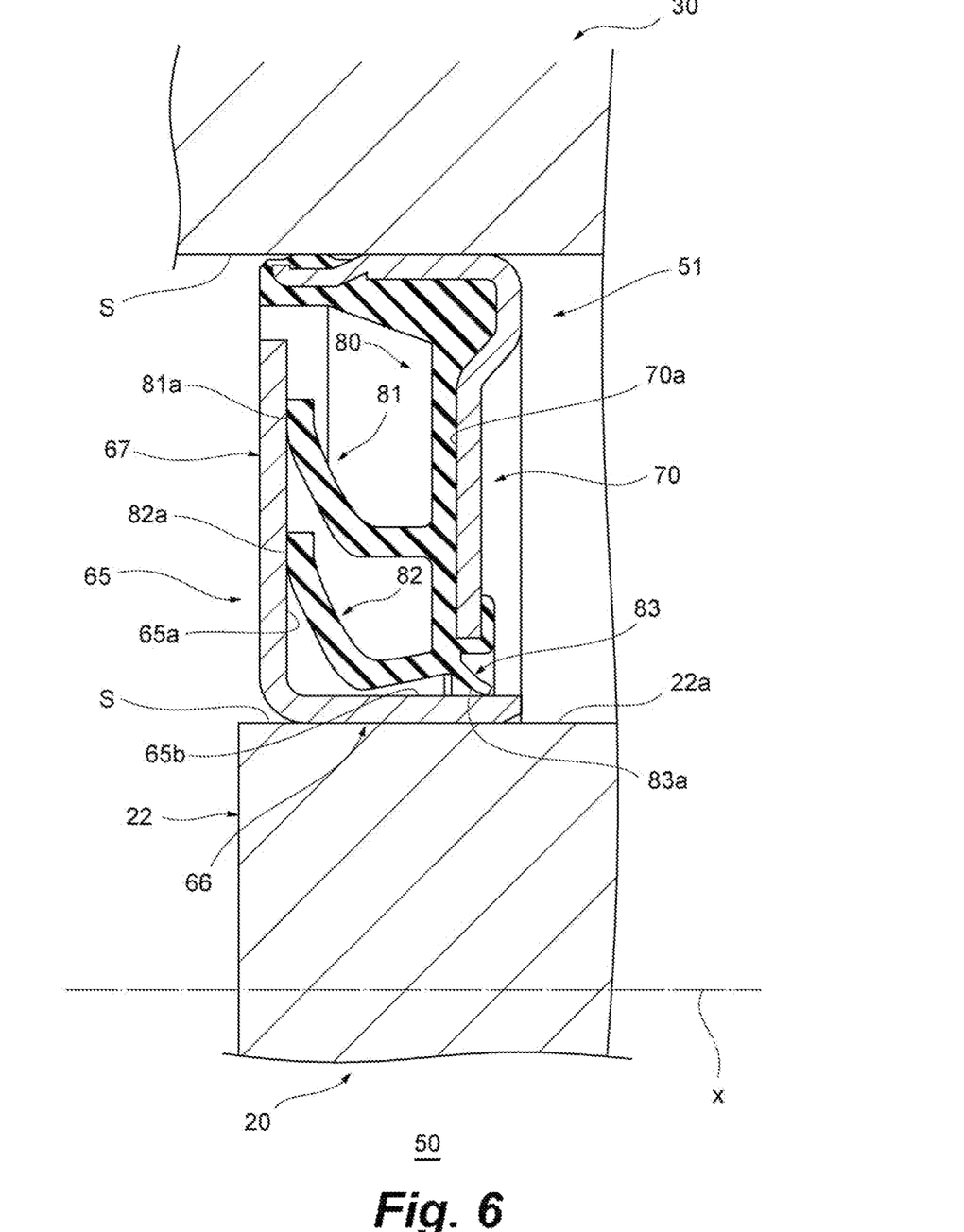
FIG. 6 is a cross-sectional view illustrating a cross section of a hub seal according to a third embodiment of the present disclosure in a state of being attached to a hub bearing, the cross section being taken along a plane including an axis x.
Figure 7:
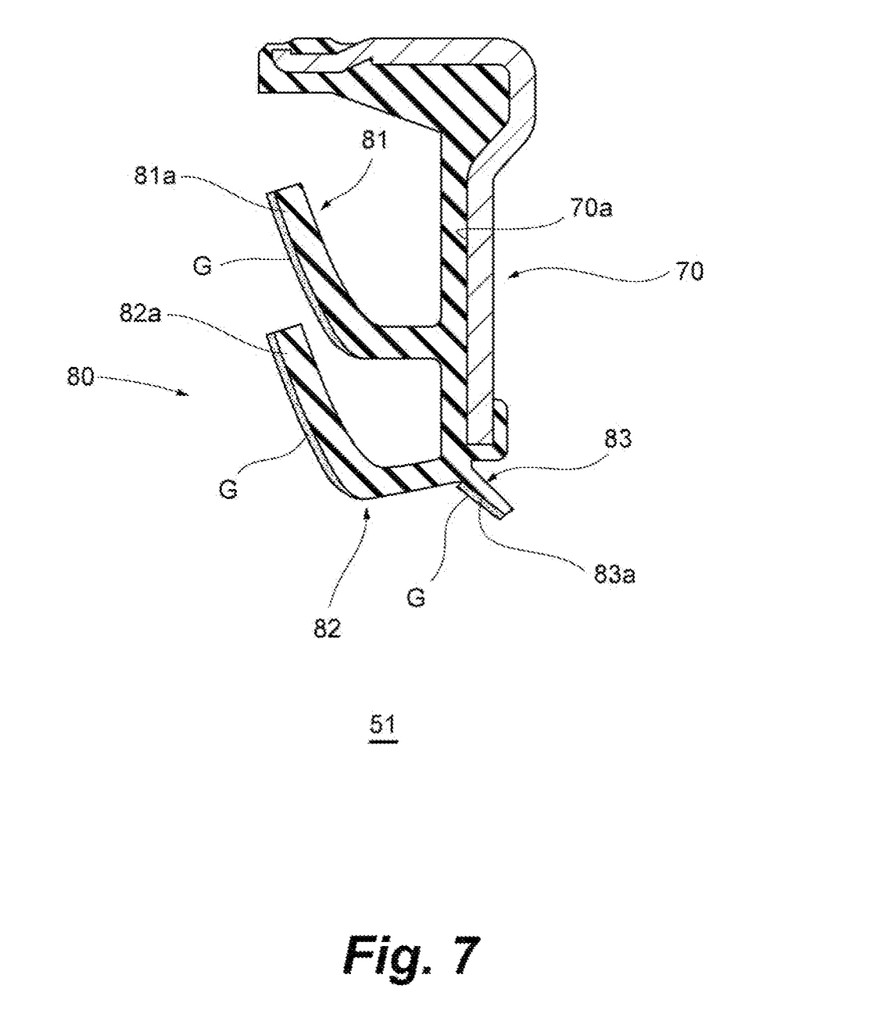
FIG. 7 is an end view of a hub seal body of the hub seal illustrated in FIG. 6.

Next, description will be made on the hub seal 50 according to a third embodiment of the present disclosure. The hub seal 50 according to the present embodiment is an inner-side hub seal as described above. The hub seal 50 includes a hub seal body 51 and a slinger 65. FIG. 6 is a cross-sectional view illustrating a cross section of the hub seal 50 according to the third embodiment of the present disclosure in a state of being attached to the hub bearing 100, the cross section being taken along a plane including an axis x. FIG. 7 is an end view of the hub seal body 51 of the hub seal 50 illustrated in FIG. 6. It should be noted that FIGS. 6 and 7 illustrate one side of the cross section of the hub seal 50 and the hub seal body 51 relative to the axis x.

The hub seal body 51 includes a base 70 and a seal member 80 attached to the base 70 as the above-described hub seal 10, the base 70 being a reinforcing ring having an annular shape around the axis x, the seal member 80 being an elastic body including an elastic material having an annular shape around the axis x. The seal member 80 includes a side lip 81 and an intermediate lip 82, the side lip 81 extending toward one side (an inner side) relative to the direction of the axis x, the intermediate lip 82 extending toward the inner side on an inner periphery side relative to the side lip 81. A sliding surface 81a of the side lip 81 is rougher than a sliding surface 82a of the intermediate lip 8. The sliding surface 81a of the side lip 81 is a seal surface of the side lip 81, which is a surface that comes into contact so as to seal the gap between the outer race member 30 and the inner race member 20. The sliding surface 82a of the intermediate lip 82 is a seal surface of the intermediate lip 82, which is a surface that comes into contact so as to seal the gap between the outer race member 30 and the inner race member 20.

The base 70 is a member including an annular rigid plate and is attached to the outer race member 30 from an inner peripheral surface side of the outer race member and fixed to the outer race member 30 as illustrated in FIGS. 6 and 7. One surface 70a of the base 70 is caused to be, in conformity to a shape of the slinger 65, a flatter annular surface not projecting further in the direction of the axis x than the one surface 2a of the base 2 of the above-described hub seal 10 as illustrated in FIGS. 6, 7.

The seal member 80 is an annular member including an elastic material and is connected with the base 70 in a manner to cover the one surface 70a of the base 70 as illustrated in FIG. 6 and FIG. 7. As illustrated in FIG. 6, the side lip 81 and the intermediate lip 82 are both seal lip portions extending in a direction away from the above-described one surface 70a of the base 70 toward the slinger 65 along the axis x to come into contact with the slinger 65, thus sealing the gap between the outer race member 30 and the inner race member 20 while being relatively slidable with respect to the slinger 65 with a rotation of the inner race member 20. The side lip 81 is a seal lip portion slidable while being in contact with the slinger 65 at a position closer to the opening S of the gap than the intermediate lip 82, in other words, a seal lip portion that prevents the entry of foreign matter upstream of the intermediate lip 82. The side lip 81 and the intermediate lip 82 are in contact with a flange 67 of the slinger 65 as described later.

The sliding surface 81a of the side lip 81 is rougher than the sliding surface 82a of the intermediate lip 8 as described above. The sliding surface 81a of the side lip 81 is similar to the sliding surface 11a of the side lip 11 of the above-described hub seal 10 and the sliding surface 82a of the intermediate lip 82 is similar to the sliding surface 12a of the intermediate lip 12 of the above-described hub seal 10. For example, the sliding surface 81a of the side lip 81 is adapted to let larger foreign matter through than the sliding surface 82a of the intermediate lip 82. Specifically, for example, a surface roughness of the sliding surface 81a of the side lip 81 is rougher than a surface roughness of the sliding surface 82a of the intermediate lip 82. The surface roughness of the sliding surface 81a of the side lip 81 is, for example, a ten-point average roughness Rzjis defined in accordance with, for example, JIS B 0601-2001 and the surface roughness of the sliding surface 82a of the intermediate lip 82 is a ten-point average roughness Rzjis defined in accordance with JIS B 0601-2001.

For example, the sliding surface 81a of the side lip 81 is a sliding surface formed by applying surface finishing as the sliding surface 11a of the side lip 11 of the above-described hub seal 10. In contrast, the sliding surface 82a of the intermediate lip 82 is a sliding surface formed without applying surface finishing as the sliding surface 12a of the intermediate lip 12 of the hub seal 10. That is to say, the sliding surface 82a of the intermediate lip 82 is a surface itself of the intermediate lip 82 formed by molding with a mold, or unfinished sliding surface. The surface finishing causes the sliding surface 81a of the side lip 81 to be rougher than the sliding surface 82a of the intermediate lip 82. It should be noted that the sliding surface 82a of the intermediate lip 82 may be a sliding surface formed by applying surface finishing. In this case, the sliding surface 82a of the intermediate lip 82 is formed by applying the surface finishing in a manner not to be rougher than the sliding surface 81a of the side lip 81. It should be noted that examples of the surface finishing for forming a sliding surface include electrical discharge machining or blast finishing.

The surface roughness of the sliding surface 81a of the side lip 81 is specifically, for example, Rzjis 0.8 µm or more as that of the sliding surface 11a of the above-described side lip 11. In addition, the surface roughness of the sliding surface 81a of the side lip 81 is specifically, for example, Rzjis 10 µm or more as that of the sliding surface 11a of the above-described side lip 11. In addition, an upper limit of the surface roughness of the sliding surface 81a of the side lip 81 is specifically, for example, Rzjis 60 µm or less as that of the sliding surface 11a of the above-described side lip 11. In addition, the surface roughness of the sliding surface 82a of the intermediate lip 82 is specifically, for example, Rzjis 0.7 µm or less as that of the sliding surface 12a of the above-described intermediate lip 12. In addition, the surface roughness of the sliding surface 82a of the intermediate lip 82 is specifically, for example, Rzjis 0.5 µm or less as that of the sliding surface 12a of the above-described intermediate lip 12. In addition, the surface roughness of the sliding surface 82a of the intermediate lip 82 is specifically, for example, Rzjis 0.4 µm or less.

A fine unevenness, or the unevenness 110, is formed in the sliding surface 81a of the side lip 81 as in the sliding surface 11a of the above-described side lip 11. The unevenness 110 is an unevenness including recesses and projections arranged at random. The unevenness 110 of the sliding surface 81a is, for example, a mat unevenness. It should be noted that the unevenness 110 of the sliding surface 81a is not limited to a mat unevenness and may have another surface texture as that of the sliding surface 11a of the above-described side lip 11. For example, the unevenness 110 of the sliding surface 81a may include a plurality of parallel protrusions extending in a direction intersecting a circumferential direction of the seal member 80. In contrast, the sliding surface 82a of the intermediate lip 82 is a surface smoother than the sliding surface 81a of the side lip 81.

The sliding surface 81a of the side lip 81 has a surface texture adapted to prevent the entry of foreign matter particles having a particle size equal to or more than a predetermined value and allow for the entry of foreign matter particles having a particle size less than the predetermined value as the sliding surface 11a of the above-described side lip 11. In addition, the sliding surface 82a of the intermediate lip 82 prevents the entry of the foreign matter particles having the particle size less than the predetermined value entering beyond the side lip 81 as the sliding surface 12a of the above-described intermediate lip 12. This reduces a contact area of the sliding surface 81a of the side lip 81 with the slinger 65 to reduce the generation of an excessive friction force, so that a rotation torque of the side lip 81 decreases. In addition, even though foreign matter having a particle size less than the predetermined value in muddy water passes through the sliding surface 81a of the side lip 81 to enter, a further entry is likely to be reduced by the sliding surface 82a of the intermediate lip 82. This results in implementation of a hub seal that decreases the rotation torque and reduces the entry of foreign matter in muddy water even under a muddy environment. In addition, the sliding surface 81a of the side lip 81 is in the form more likely to suffer the entry of foreign matter than the intermediate lip 82, which is at least partly compensated by the pumping operation as the above-described side lip 11. Even in this respect, the hub seal 50 is a hub seal that decreases the rotation torque and reduces the entry of foreign matter in muddy water even under a muddy environment.

In addition, the seal member 80 includes a grease lip 83 as illustrated in, for example, FIGS. 6 and 7. The grease lip 83 is slidable while being in contact with a fitting portion 66 of the slinger 65 at a position spaced more from the opening S of the gap than the intermediate lip 82 as described later. A position for a seal surface of the grease lip 83, or sliding surface 83a, to come into contact is on an inner periphery side relative to a position for the sliding surface 82a of the intermediate lip 82 to come into contact.

The sliding surface 83a of the grease lip 83 is, for example, a sliding surface formed by applying surface finishing. A surface roughness of the sliding surface 83a of the grease lip 83 is, for example, rougher than the surface roughness of the sliding surface 81a of the side lip 81. The surface roughness of the sliding surface 83a of the grease lip 83 is a ten-point average roughness Rzjis defined in accordance with, for example, JIS B 0601-2001. It should be noted that the sliding surface 83a of the grease lip 83 may be a sliding surface formed without applying surface finishing. Thus, the surface roughness of the sliding surface 83a of the grease lip 83 may not be rougher than the surface roughness of the sliding surface 81a of the side lip 81.

The slinger 65 has a contact surface 65a that is an annular surface facing the direction of the axis x and a contact surface 65b that is an annular surface facing the radial direction as illustrated in FIG. 6. Similarly to the above-described hub seal 10A, in a usage state where the hub seal body 51 and the slinger 65 are attached to desired positions in the hub bearing 100, the sliding surface 81a of the side lip 81 is adapted to come into contact with the annular contact surface 65a of the slinger 65 and the sliding surface 82a of the intermediate lip 12 is adapted to come into contact with the annular contact surface 65a of the slinger 65. The contact surface 65a of the slinger 65 extends along a plane orthogonal to the axis x. In addition, the sliding surface 83a of the grease lip 83 is adapted to come into contact with the cylindrical contact surface 65b of the slinger 65.

Specifically, the slinger 65 is, for example, an annular plate-shaped member as illustrated in FIG. 6 and mainly includes a fitting portion 66 that is a portion extending in the direction of the axis x annularly around the axis x and the flange 67 that is an annular portion extending on an outer periphery side on an inner side relative to the fitting portion 66. The flange 67 forms the contact surface 65a. In addition, the fitting portion 66 forms the contact surface 65b.

The fitting portion 66 is, for example, a cylindrical or substantially cylindrical portion around or substantially around the axis x and is formed to be fit-attachable to the outer peripheral surface 22a of the shaft 22 of the inner race member 20. The contact surface 65b of the fitting portion 66 is, for example, a cylindrical surface or a substantially cylindrical surface around or substantially around the axis x. The flange 67 is a portion in a form of or substantially in a form of a hollow disc radially stretching around or substantially around the axis x.

The slinger 65 is adapted to come into close contact with the inner race member 20. Specifically, the fitting portion 66 of the slinger 65 and the outer peripheral surface 22a of the shaft 22 of the inner race member 20 are adapted to come into close contact with each other so that no gap passable for foreign matter is formed between the fitting portion 66 and the outer peripheral surface 22a. It should be noted that the slinger 65 and the inner race member 20 may be not in close contact with each other as described above. In this case, for example, an annular gasket (not illustrated) may be provided between the slinger 65 and the inner race member 20 so as to prevent foreign matter from entering a gap between the inner race member 20 and the outer race member 30 through a gap between the slinger 65 and the inner race member 20.

The slinger 65 is integrally formed from, for example, a metal plate by press working or forging as the slinger 60 and the fitting portion 66 and the flange 67 are portions of the integrally formed slinger 65. Examples of the metal material for the slinger 65 include stainless steel and SPCC (a cold rolled steel sheet).

As illustrated in FIG. 6, the sliding surface 81a of the side lip 81 is adapted to come into contact with the contact surface 65a of the flange 67 of the slinger 65. In addition, the sliding surface 82a of the intermediate lip 82 is adapted to come into contact with the contact surface 65a of the flange 67 of the slinger 65. In addition, the sliding surface 83a of the grease lip 83 is adapted to come into contact with the contact surface 65b of the fitting portion 66 of the slinger 65.

The grease G serving as a lubricant may be applied to the sliding surface 81a of the side lip 81 and the sliding surface 82a of the intermediate lip 82 as illustrated in FIG. 7. The grease G is a grease containing a base oil having a kinematic viscosity at 40° C., for example, in a range from 10 mm$^2$/s to 40 mm$^2$/s. It should be noted that the grease G may be applied also to the sliding surface 83a of the grease lip 83. The grease G makes it possible to decrease the rotation torques of the side lip 81, the intermediate lip 82, and the grease lip 83.

The hub seal 50 according to the present embodiment has the above-described configuration and is able to operate similarly to the above-described hub seal 10 to produce a similar effect.

In the foregoing, the present disclosure is described through the above-described embodiments; however, the technical scope of the present disclosure is by no means limited to the scopes according to the embodiments. It is obvious to those skilled in the art that various modifications or improvements are allowed to be added to the above-described embodiments. It is obvious from recitations of claims that a form added with such a modification or an improvement is also within the technical scope of the present disclosure.

The embodiments described in the foregoing are merely intended to facilitate understanding of the present disclosure and should not be interpreted to limit the present disclosure. In addition, the above-described embodiments are not intended to limit an application target to which the present disclosure is to be applied and anything may be included as the application target of the present disclosure. Components of the above-described embodiments and arrangements, materials, conditions, shapes, sizes, and the like of the components are by no means limited to those described as examples and may be altered, if necessary. For example, the present disclosure may include a difference necessitated by implementation, such as a manufacturing tolerance. In addition, the components referred to in the different embodiments are allowed to be partly replaced or combined unless a technical inconsistency occurs. In addition, configurations may be appropriately selectively combined to solve at least part of the above-described problems and achieve at least part of the above-described effects.

For example, the hub seals 10, 10A, 50 may include another side lip 11 or side lip 81 or another plurality of side lips 11 or side lips 81 on the outer periphery side of the side lip 11 or the side lip 81. Even in this case, the sliding surfaces 11a, 81a of the side lips 11, 81 on the outermost periphery side are caused to be the roughest and the sliding surfaces 12a, 82a of the intermediate lips 12, 82 are caused to be not rougher than the sliding surfaces 11a, 81a of the side lips 11, 81 as in the above-described hub seals 10, 10A, 50. In addition, out of adjacent ones of lips, a roughness of a sliding surface of the lip adjacent on the outer periphery side is caused to be rougher than a roughness of a sliding surface of the lip adjacent on the inner periphery side.

INDUSTRIAL APPLICABILITY

The present disclosure is beneficial in implementing a hub seal that decreases a rotation torque and reduces the entry of foreign matter in muddy water even under a muddy environment.

What is claimed is:

1. A sealing device for a hub bearing for sealing a gap between an outer race member and an inner race member of a hub bearing, the sealing device comprising:
    a base having an annular shape around an axis; and
    an elastic body attached to the base, the elastic body including an elastic material having an annular shape around the axis, wherein
    the elastic body includes a side lip extending toward one side relative to a direction of the axis, an intermediate lip extending toward the one side on an inner periphery side relative to the side lip, and a grease lip,
    a seal surface of the side lip that is a surface that comes into contact to seal the gap has a surface roughness that is greater than that of a seal surface of the intermediate lip that is a surface that comes into contact to seal the gap,
    a position of a seal surface of the grease lip, the seal surface of the grease lip being a surface that comes into contact to seal the gap, is on an inner side of the grease lip that faces the seal surface of the intermediate lip, and
    a surface roughness of the seal surface of the grease lip is greater than that of the seal surface of the intermediate lip.

2. The sealing device for a hub bearing according to claim 1, wherein
    the surface roughness of the seal surface of the side lip is a ten-point average roughness Rzjis defined in accordance with JIS B 0601-2001, and is 0.8 µm or greater, and
    the surface roughness of the seal surface of the intermediate lip is a ten-point average roughness Rzjis defined in accordance with JIS B 0601-2001, and is 0.7 µm or less.

3. The sealing device for a hub bearing according to claim 1, wherein
    the seal surface of the side lip is a seal surface formed by applying surface finishing, and
    the seal surface of the intermediate lip is a seal surface formed by applying surface finishing or a seal surface formed without applying surface finishing.

4. The sealing device for a hub bearing according to claim 1, wherein
    the seal surface of the grease lip is a seal surface formed by applying surface finishing or a seal surface formed without applying surface finishing.

5. The sealing device for a hub bearing according to claim 1, wherein
    a grease is applied to the seal surface of the side lip and the seal surface of the intermediate lip, and
    a base oil of the grease is a base oil having a kinematic viscosity at 40° C. in a range from 10 mm$^2$/s to 40 mm$^2$/s.

6. The sealing device for a hub bearing according to claim 1, wherein
    the seal surface of the side lip is adapted to come into contact with the inner race member, and
    the seal surface of the intermediate lip is adapted to come into contact with the inner race member.

7. The sealing device for a hub bearing according to claim 1, further comprising a slinger attachable to the inner race member, the slinger having an annular shape around the axis, wherein
- the seal surface of the side lip is adapted to come into contact with the slinger, and
- the seal surface of the intermediate lip is adapted to come into contact with the slinger.

8. The sealing device for a hub bearing according to claim 7, wherein
- the slinger has an annular surface facing the direction of the axis,
- the seal surface of the side lip is adapted to come into contact with the annular surface of the slinger, and
- the seal surface of the intermediate lip is adapted to come into contact with the annular surface of the slinger.

9. The sealing device for a hub bearing according to claim 8, wherein the annular surface of the slinger extends along a plane orthogonal to the axis.

10. The sealing device for a hub bearing according to claim 9, wherein the sealing device is an inner-side hub seal.

11. The sealing device for a hub bearing according to claim 7, wherein the slinger is configured to extend along a flange of the inner race member.

12. The sealing device for a hub bearing according to claim 11, wherein the sealing device is an outer-side hub seal.

13. The sealing device for a hub bearing according to claim 7, wherein the seal surface of the grease lip is adapted to come into contact with the slinger.

14. The sealing device for a hub bearing according to claim 1, wherein the surface roughness of the seal surface of the grease lip is greater than that of the seal surface of the side lip.

* * * * *